(12) United States Patent
Bailey et al.

(10) Patent No.: US 8,730,077 B2
(45) Date of Patent: May 20, 2014

(54) READ CHANNEL WITH SELECTIVE OVERSAMPLED ANALOG TO DIGITAL CONVERSION

(75) Inventors: James A. Bailey, Snowflake, AZ (US); Nayak Ratnakar Aravind, Allentown, PA (US); Robert H. Leonowich, Fleetwood, PA (US); Erich F. Haratsch, Bethlehem, PA (US)

(73) Assignee: LSI Corporation, San Jose, CA (US)

( * ) Notice: Subject to any disclaimer, the term of this patent is extended or adjusted under 35 U.S.C. 154(b) by 23 days.

(21) Appl. No.: 13/215,806

(22) Filed: Aug. 23, 2011

(65) Prior Publication Data

US 2013/0050004 A1 Feb. 28, 2013

(51) Int. Cl.
*H03M 1/12* (2006.01)

(52) U.S. Cl.
USPC .......................................... 341/155; 341/143

(58) Field of Classification Search
USPC .......................... 341/143, 155, 144; 375/269
See application file for complete search history.

(56) References Cited

U.S. PATENT DOCUMENTS

| | | | |
|---|---|---|---|
| 5,325,318 A * | 6/1994 | Harris et al. .................. 708/313 |
| 5,886,842 A * | 3/1999 | Ziperovich ..................... 360/51 |
| 6,003,051 A * | 12/1999 | Okazaki ............................. 708/3 |
| 6,313,961 B1 * | 11/2001 | Armstrong et al. ............. 360/46 |
| 6,492,922 B1 * | 12/2002 | New ............................... 341/120 |
| 7,791,830 B2 * | 9/2010 | Miyashita ........................ 360/65 |
| 7,859,439 B2 * | 12/2010 | Chen et al. ..................... 341/120 |
| 8,154,972 B2 * | 4/2012 | Ratnakar Aravind ...... 369/59.21 |
| 8,184,390 B1 * | 5/2012 | Xia et al. ......................... 360/43 |
| 8,320,862 B2 * | 11/2012 | Takahashi ..................... 455/205 |
| 2013/0050005 A1 * | 2/2013 | Liu et al. ....................... 341/155 |

* cited by examiner

*Primary Examiner* — Peguy Jean Pierre
(74) *Attorney, Agent, or Firm* — Ryan, Mason & Lewis, LLP

(57) ABSTRACT

Methods and apparatus are provided for processing a signal in a read channel using a selective oversampled analog to digital conversion. The disclosed selective oversampled analog to digital conversion simplifies the analog design by transferring at least a portion of the equalization and/or filtering processes to the digital domain. An analog input signal in a read channel is converted to a digital signal to generate one or more digital samples corresponding to the analog input signal for a given bit interval. The analog input signal is selectively filtered in an analog domain in a first mode and the digital samples are selectively filtered in a digital domain in a second mode. A data detection algorithm is applied to the digital samples to obtain a detected output. The selection of the first mode and the second mode can be, for example, based on channel conditions. The analog to digital conversion can be performed at a baud rate in the first mode and at an oversampled rate in the second mode.

20 Claims, 10 Drawing Sheets

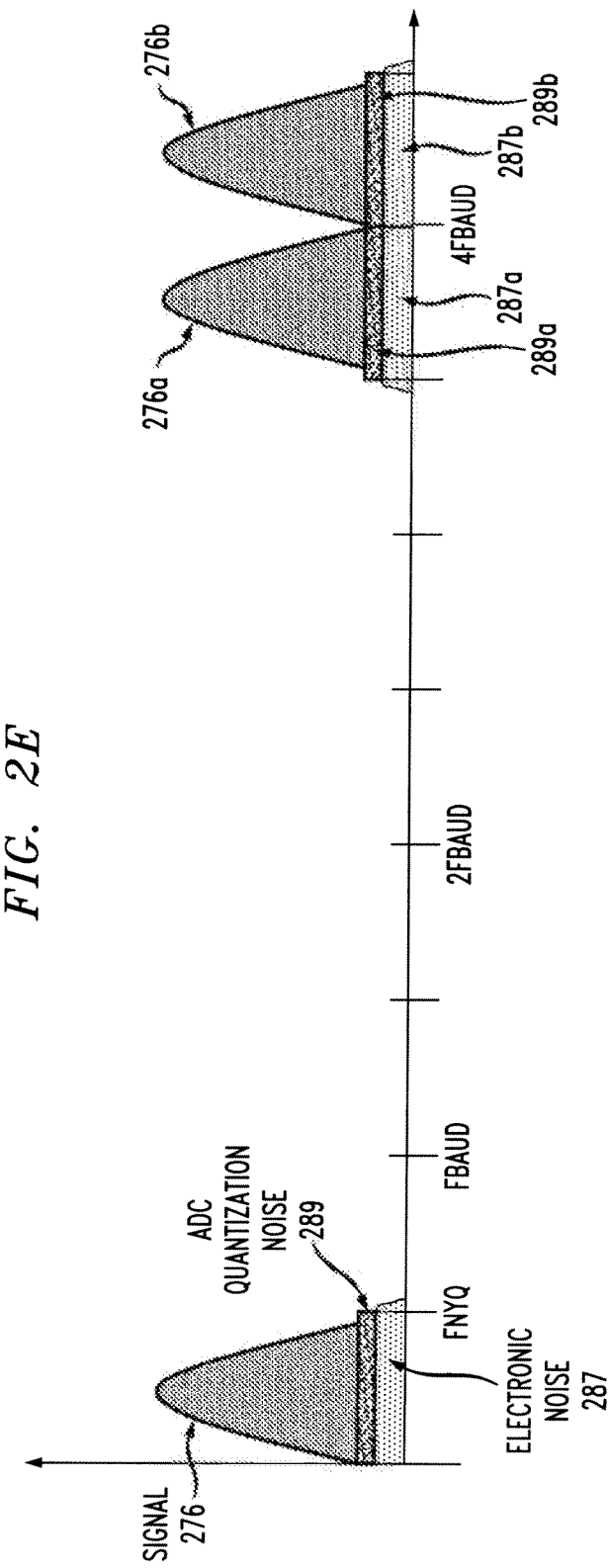

READ CHANNEL WITH SELECTIVE OVERSAMPLED ANALOG TO DIGITAL CONVERSION

CROSS-REFERENCE TO RELATED APPLICATIONS

The present invention is related to U.S. patent application Ser. No. 13/215,803, entitled "Read Channel With Oversampled Analog to Digital Conversion," U.S. patent application Ser. No. 13/215,810, entitled "Determining Coefficients for Digital Low Pass Filter Given Cutoff and Boost Values For Corresponding Analog Version," and U.S. patent application Ser. No. 13/215,815, entitled "Read Channel With Oversampled Analog to Digital Conversion and Parallel Data Detectors," each filed contemporaneously herewith and incorporated by reference herein.

FIELD OF THE INVENTION

The present invention relates generally to read channels and, more particularly, to improved read channels that use an oversampled analog to digital conversion.

BACKGROUND OF THE INVENTION

A magnetic recording read channel converts an analog read signal into an estimate of the user data that was recorded on a magnetic medium. Read heads and magnetic media introduce noise and other distortions into the read signal. For example, as the information densities in magnetic recording increase, the intersymbol interference (ISI) becomes more severe (i.e., the channel impulse response becomes longer). ISI is a form of signal distortion in which one symbol interferes with one or more other symbols.

In a conventional read channel, a continuous-time filter (CTF) typically processes the read signal in the analog domain to perform anti-alias filtering, band-limit filtering to reduce electronic noise, and signal shape filtering to reduce ISI. Generally, anti-alias filtering removes noise and residual signal components above the Nyquist frequency (equal to half the baud rate frequency) to avoid aliasing. An analog-to-digital converter (ADC) typically processes the CTF output to generate digital samples for further processing in the digital domain. A Viterbi detector is often used in a read channel to process the digital samples and detect the recorded data bits in the presence of intersymbol interference and other noise.

As process technology gets smaller and data rates increase, it becomes increasingly challenging to build analog circuits, such as the CTF filters, that meet the demanding performance specifications of read channels. A need therefore exists for improved read channels that transfer a portion of the signal processing burden from the analog domain to the digital domain, to thereby simplify the analog circuitry design. A further need exists to improve the signal-to-noise ratio (SNR) and error rate performance of read channel devices. A need therefore exists for improved read channels that allow more complex signal processing techniques to be applied in the digital domain. Yet another need exists for improved read channels that provide selective oversampling of the analog to digital conversion.

SUMMARY OF THE INVENTION

Generally, methods and apparatus are provided for processing a signal in a read channel using a selective oversampled analog to digital conversion. The disclosed selective oversampled analog to digital conversion simplifies the analog design by transferring at least a portion of the equalization and/or filtering processes to the digital domain. According to one aspect of the invention, a method is provided for processing a signal in a read channel. An analog input signal is converted to a digital signal to generate one or more digital samples corresponding to the analog input signal for a given bit interval. The analog input signal is selectively filtered in an analog domain in a first mode and the digital samples are selectively filtered in a digital domain in a second mode. A data detection algorithm is applied to the digital samples to obtain a detected output.

The selective filtering step optionally bypasses the analog filtering in the second mode. The selective filtering step optionally bypasses the digital filtering in the first mode. The selection of the first mode and the second mode can be, for example, based on channel conditions.

Generally, the first mode corresponds to a continuous time domain and the second mode corresponds to an oversampled domain. In addition, the analog to digital conversion can be performed at a baud rate in the first mode and at an oversampled rate in the second mode.

A more complete understanding of the present invention, as well as further features and advantages of the present invention, will be obtained by reference to the following detailed description and drawings.

BRIEF DESCRIPTION OF THE DRAWINGS

FIGS. 2E and 2F illustrate the power spectral density of signal, noise and ADC quantization noise at the output of the DLPF and downsampler of FIG. 2A, respectively, as a function of frequency;

FIGS. 3A and 3B illustrate an exemplary technique for determining the filter coefficients for the DLPF of FIG. 2A;

DETAILED DESCRIPTION

The present invention provides a selective oversampled ADC that optionally generates a plurality of digital samples per bit period. The oversampled ADC optionally allows a portion of the filtering to be performed in the analog domain and a portion of the filtering to be performed in the digital domain. According to one aspect of the present invention, the read channel can be configured to selectively filter the analog input signal in an analog domain in a first (baud rate) mode or to filter the oversampled digital samples in a digital domain in a second (oversampled) mode. Generally, the first mode corresponds to a continuous time domain and the second mode corresponds to an oversampled domain. In this manner, the digital filtering can be optionally bypassed in the first mode and the analog filtering can be optionally bypassed in the second mode.

The selection can be based, for example, on channel conditions. In this manner, baud-rate functionality is preserved in the oversampling read channel, and also overall system performance can be improved by selecting the better of the two modes (baud-rate vs. oversampling rate) depending on the channel conditions. As discussed hereinafter, the oversampled analog to digital conversion can be performed at a baud rate in the first mode and at an oversampled rate in the second mode.

Figure 1:
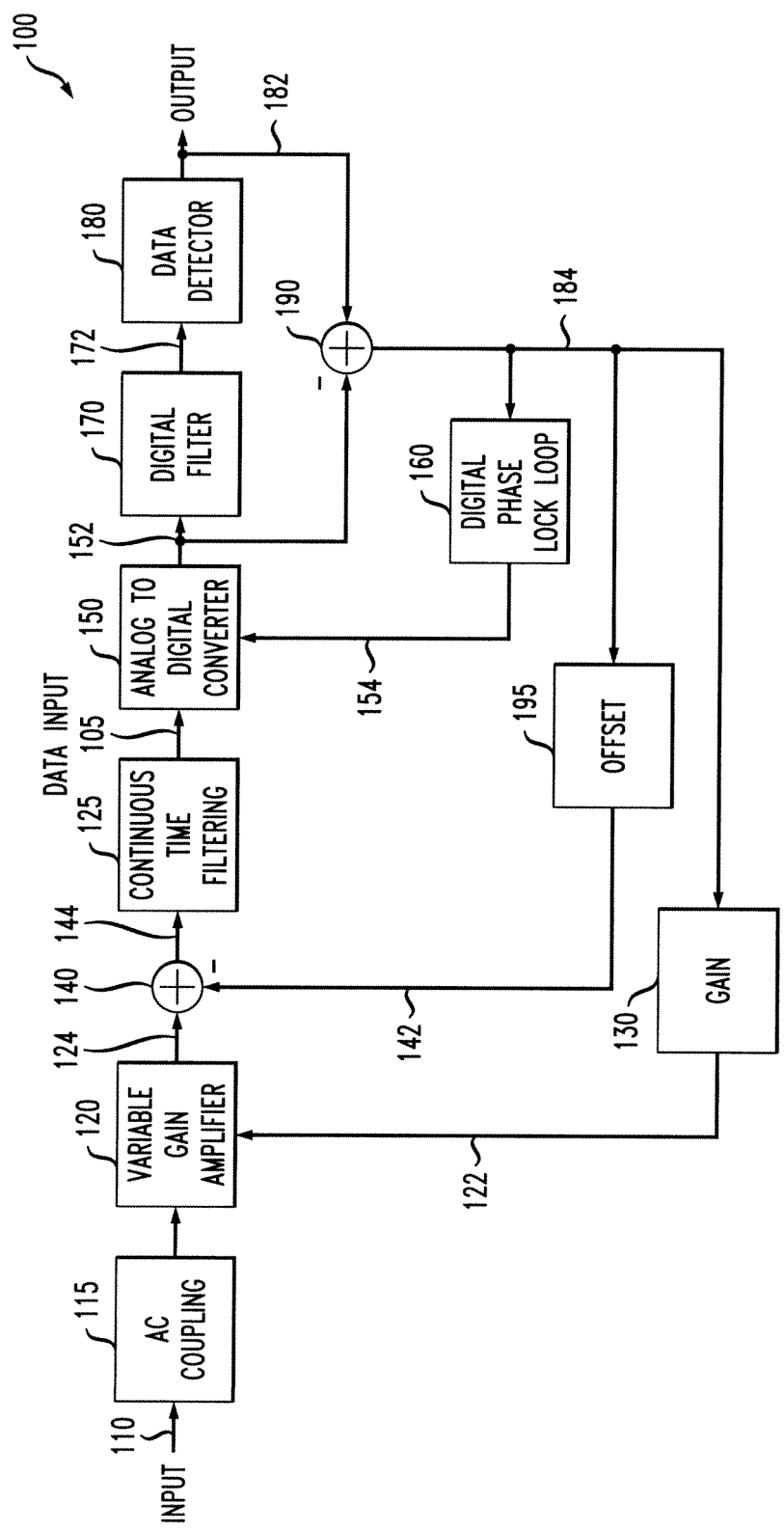
FIG. 1 illustrates an exemplary conventional data detection system including various feedback loops.

FIG. 1 illustrates an exemplary, conventional data detection system 100 including various feedback loops. Data detection system 100 includes an analog front end (AFE) that receives an analog input signal 110 via AC coupling 115. For example, where input signal 110 is a magnetic signal sensed from a magnetic storage medium, AC coupling 115 may include circuitry capable of converting a sensed magnetic field to a corresponding analog electrical signal.

The output of AC coupling 115 is amplified using a variable gain amplifier 120. The gain applied by variable gain amplifier 120 is governed by a gain feedback value 122 that is provided by a gain calculation circuit 130. Gain calculation circuit 130 may be any circuit known in the art that is capable of providing a variable gain output based on an input error signal.

The amplified input 124 is summed with an offset value 142 using a summation element 140. Offset value 142 is provided by an offset circuit 195. The sum 144 is provided to a continuous time filter (CTF) 125 that operates to filter undesirable noise from the received analog signal, as discussed above. Continuous time filter 125 provides a data input 105 that is representative of analog input signal 110. Continuous time filter 125 may be any filter known in the art that is capable of reducing or eliminating noise from a received analog signal. For example, continuous time filter 125 may be a low pass filter capable of reducing or eliminating high frequency noise from a signal. A variety of filters and filter architectures may be used in accordance with different embodiments of the invention, as would be apparent to a person of ordinary skill in the art.

Data input 105 is provided to an analog to digital converter (ADC) 150 that converts the continuous analog signal into a series of corresponding digital samples 152. Digital samples 152 are obtained in accordance with a clock signal 154 generated based on the received data by a digital phase lock loop circuit 160. Digital samples 152 are provided to a digital filter 170 that provides a filtered output 172 to a data detector 180. Digital filter 170 may be embodied, for example, as a digital finite impulse response filter, as known in the art. Data detector 180 provides an ideal output 182 that is subtracted from the corresponding digital samples 152 using a summation element 190. Data detector 180 may be any known data detector circuit, such as a Viterbi algorithm data detector.

The resulting output of summation element 190 is an error signal 184 that is used to drive digital phase lock loop circuit 160, offset circuit 195 and gain calculation circuit 130.

Exemplary data detection system 100 utilizes three adaptive feedback loops. The first loop includes digital phase lock loop circuit 160 and is operable to adaptively adjust the sampling period used by analog to digital converter 150 to sample data input 105 (i.e., adjusting the phase and/or frequency of clock signal 154). The second loop includes offset circuit 195 that is used to adaptively adjust any DC offset from the received analog input. The third loop includes gain calculation circuit 130 that is used to adaptively adjust the gain used in preprocessing the received analog input signal.

The exemplary conventional data detection system 100 may also include a magneto-resist asymmetric (MRA) correction filter (not shown in FIG. 1), for example, prior to the CTF 125. Generally, magneto-resistive (MR) heads that are used for magnetic recording exhibit non-linear transfer functions. Ideally, the output current(s) from the head is linearly related to the magnetic flux being read (x). However, most heads exhibit quadratic non-linearity, with the result that the output current is expressed as $s=kx+ax^2$, where k is a scaling factor and $\alpha$ controls the level of non-linearity in the head. This phenomenon is referred to as MR asymmetry (MRA) in the head. In a conventional read channel, the analog portion may have an MRA correction (MRAC) block, which approximates the inverse transfer function needed to linearize the head output, as discussed further below in conjunction with FIG. 4.

As previously indicated, the present invention recognizes that some of the signal processing burden can be transferred from the analog domain (prior to the ADC 150 of FIG. 1) to the digital domain. According to one aspect of the invention, an oversampled ADC generates a plurality of digital samples per bit period. Among other benefits, the oversampled digital samples allow the CTF circuit design to be simplified by transferring at least a portion of the equalization process to the digital domain.

Figure 2A:
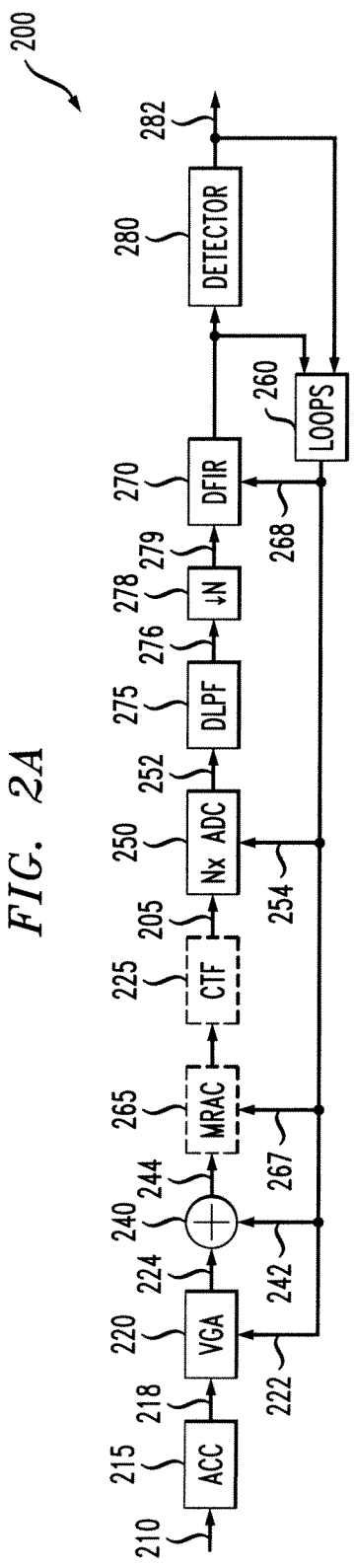
FIG. 2A illustrates an exemplary data detection system incorporating various aspects of the present invention.

FIG. 2A illustrates an exemplary data detection system 200 incorporating various aspects of the present invention. The data detection system 200 includes an analog front end (AFE) that receives an analog input signal 210 via AC coupling 215, in a similar manner to the conventional data detection system 100 of FIG. 1. In addition, the output of AC coupling 215 is amplified using a variable gain amplifier 220, governed by a gain feedback value 222 that is provided by a feedback loop 260, in a similar manner to FIG. 1. The output of the variable gain amplifier 220 is discussed further below in conjunction with FIGS. 2B and 2C. The amplified input 224 is summed with an offset value 242 using a summation element 240. Offset value 242 is provided by a feedback loop 260, in a similar manner to FIG. 1.

As shown in FIG. 2A, the sum 244 is provided to an optional MRA correction filter 265 that approximates the inverse transfer function needed to linearize the output of the read head, as discussed further below in conjunction with FIG. 4. The output of the MRA correction filter 265 is applied to an optional CTF 225 that may operate to filter undesirable noise from the received analog signal, as discussed above. According to one aspect of the present invention, the CTF 225 is simplified by transferring at least a portion of the equalization process to the digital domain. For example, in one embodiment, CTF 225 performs anti-aliasing filtering, and partial band-limit filtering of electronic noise. The present invention recognizes that additional band-limit filtering of electronic noise, as well as signal shape filtering to reduce ISI can be better performed in the digital domain, as discussed further below in conjunction with FIG. 2F. A suitable transfer function, H(s), for the CTF 225 is provided below in the section entitled "Determining Coefficients for Digital LPF," where the numerator stages indicate the zeros and the denominator indicate the poles.

CTF 225 provides a data input 205 that is representative of analog input signal 210. CTF 225 may be any filter known in the art that is capable of reducing or eliminating noise from a received analog signal. A variety of filters and filter architectures may be used in accordance with different embodiments of the invention, as would be apparent to a person of ordinary skill in the art.

Data input 205 is provided to an oversampled ADC 250 that converts the continuous analog signal 205 into a plurality (N) of corresponding digital samples 252 for each bit interval. For example, the oversampling may generate N=2 or N=4 digital samples 252 for each bit interval. While the present invention is illustrated herein using an exemplary oversampling rate of N=4, any oversampling rate can be employed, as would be apparent to a person of ordinary skill in the art. In general, the oversampling rate may be any integer or fractional multiple that is greater than one (1).

Digital samples 252 are obtained in accordance with a clock signal 254 generated based on the received data, for example, by a digital phase lock loop circuit within loops 260, as discussed above in conjunction with FIG. 1.

The oversampled digital samples 252 are then filtered by a digital low pass filter (DLPF) 275, discussed further below in conjunction with FIGS. 3A through 3C. Generally, the DLPF 275 performs additional band-limit filtering of electronic noise, as well as signal shape filtering to reduce ISI, in accordance with the present invention.

In the exemplary embodiment of FIG. 2A, the filtered output 276 generated by the DLPF 275 is then downsampled to a baud rate by a downsampling circuit 278. As discussed further below in conjunction with FIG. 3C, the DLPF 275 and downsampling circuit 278 can optionally be implemented as a single circuit. The downsampled output 279 generated by the downsampling circuit 278 comprises a single digital sample for each bit interval. The downsampled output 279 is provided to a digital FIR filter 270 (DFIR) that provides a filtered output to a data detector 280, in a similar manner to FIG. 1. Data detector 280, such as a Viterbi algorithm data detector, provides an ideal output 282 that is processed by feedback loops 260. The data detector 280 may be any known data detector circuit. An exemplary data detector 280 is discussed further below in conjunction with FIG. 5.

The feedback loops 260 may comprise, for example, the gain calculation circuit 130, offset circuit 195 and digital phase lock loop circuit 160 of FIG. 1, that generate a gain feedback value 222, an offset value 242 and a clock signal 254, respectively, in a similar manner to FIG. 1.

In addition, the feedback loops 260 generate a feedback value 267 for the MRA correction filter 265, in a known manner, as discussed further below in conjunction with FIG. 5A, and a set of equalizer coefficients 268 for the DFIR filter 270, as discussed further below in conjunction with FIGS. 6A and 6B.

As discussed hereinafter, FIGS. 2B through 2F illustrate various power spectral densities at various points in the exemplary data detection system 200. While electronics and ADC quantization noise are shown as an example, the explanations would apply to power spectral densities for any other noise components that are present at the input to the VGA 218, as would be apparent to a person of ordinary skill in the art.

Figure 2B:
FIG. 2B illustrates the power spectral densities of the signal and noise at the input of the variable gain amplifier of FIG. 2A.

FIG. 2B illustrates the power spectral densities of the signal 218 and noise 287 at the input of the variable gain amplifier 220, where fbaud is the baud-rate frequency and fnyq is the Nyquist frequency (equal to half the baud rate frequency). Without loss of generality, the power spectral densities are idealized in FIG. 2B. Typically, the data-carrying signal 218 will have significant power density components within the Nyquist band from 0 up to the Nyquist frequency, fnyq, while the noise 287 can be present at any frequency. For illustration purposes, electronic noise 287 is shown in FIG. 2B, which is typically white and constant across all frequencies. Real-life signals 218 may also contain noise sources with other frequency characteristics.

The power spectral densities of the signal 224 and noise 287 at the output of the variable gain amplifier 220 would look similar to FIG. 2B, if the variable gain amplifier does not perform signal shaping or band limit filtering (i.e., if the variable gain amplifier 220 has high bandwidth).

Figure 2C:
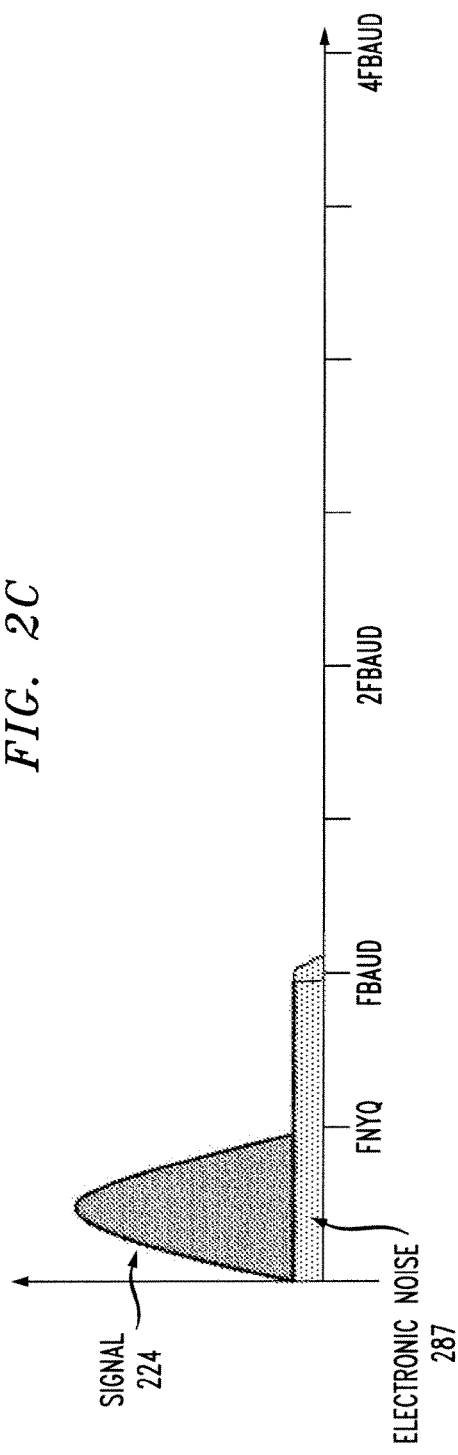
FIG. 2C illustrates the power spectral density of the signal and noise at the output of a limited bandwidth variable gain amplifier of FIG. 2A, as a function of frequency.

FIG. 2C illustrates the power spectral density of the signal 224 and noise 287 at the output of the variable gain amplifier 220 of FIG. 2A, as a function of frequency, where the variable gain amplifier 220 has limited bandwidth. In an exemplary embodiment, the variable gain amplifier 220 has a low pass filter transfer function with a passband covering the frequencies up to about the baud rate frequency, fbaud, and a low pass corner frequency at about the baud rate frequency. In this case, the exemplary variable gain amplifier 220 should maintain the analog signal 224 without distortion up to the baud rate frequency, fbaud, and cut off noise 287 above the baud rate frequency. In an alternative embodiment, the CTF 225 performs the low pass filtering function instead of the variable gain amplifier 220, or the low pass filtering function is distributed between the variable gain amplifier 220 and the CTF 225.

Generally, the low pass corner frequency of this low pass filtering should lie somewhere between the Nyquist frequency and half the oversampling frequency, which is four times the baud rate frequency in the exemplary embodiment. The low pass filter corner frequency should not be above half the oversampling frequency in order to avoid aliasing of signal and noise components at the output of the oversampling ADC 250. It is advantageous to choose a low pass corner frequency above the Nyquist frequency such as at the baud rate frequency in order to reduce the implementation complexity of the analog variable gain amplifier 220 or CTF 225. In this case, the rolloff of the transfer function at the low pass corner frequency does not have to be designed as steep as in a conventional baud rate system.

Figure 2D:
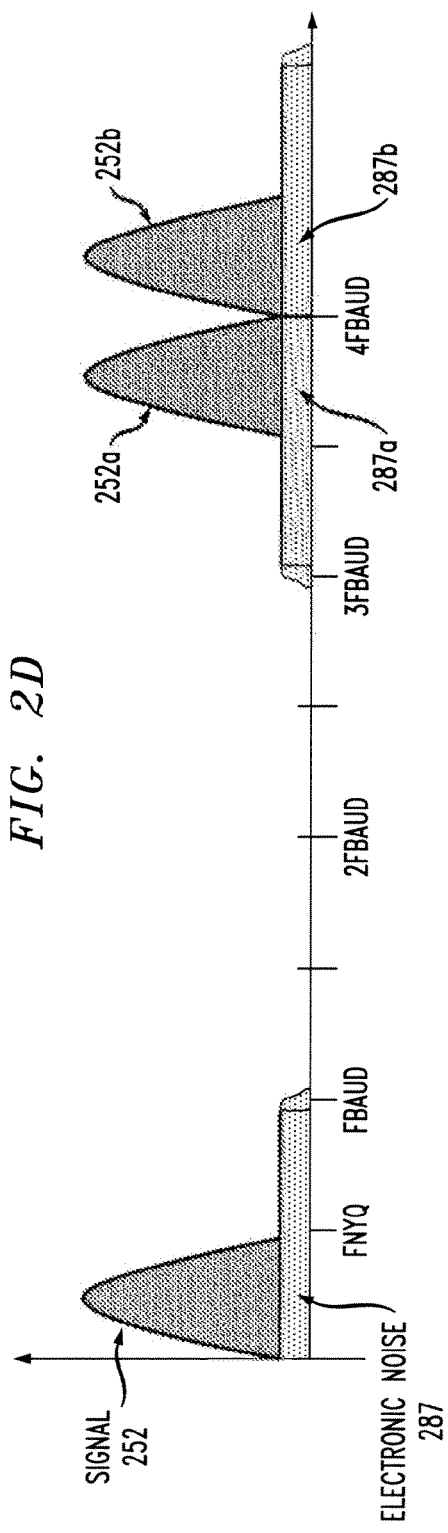
FIG. 2D illustrates the power spectral density of signal and noise at the output of the oversampled ADC of FIG. 2A, as a function of frequency, for an ADC with no quantization noise.

FIG. 2D illustrates the power spectral density of signal 252 and noise 287 at the output of the oversampled ADC 250 of FIG. 2A, as a function of frequency, for an ADC with no quantization noise (i.e., an ideal ADC with infinite precision). Due to oversampling, there are spurious copies 252a, 252b of the signal 252 and noise densities 287a, 287b of the noise 287 at four times (4×) the baud rate frequency. As shown in FIG. 2D, the spurious copies 252a, 252b, 287a, 287b are double sided and centered around 4 fbaud since the oversampling ratio is 4 in the exemplary embodiment. Additional double-sided spurious copies of signal 252 and noise 287 exist at other multiples of 4×, such as 8× and 16×, and these spurious copies are not shown in FIG. 2D for ease of illustration. Generally, for an oversampling ratio of N, double-sided spurious copies occur at multiples of N times the baud rate frequencies, such as Nfbaud, 2Nfbaud, and 3Nfbaud. It is noted that for a finite precision ADC, ADC quantization noise would also be present.

FIG. 2E illustrates the power spectral density of signal 276, noise 287 and ADC quantization noise 289 at the output of the DLPF 275 of FIG. 2A, as a function of frequency. Due to oversampling, there are spurious copies 276a, 276b of the signal 276; spurious copies 287a, 287b of the noise densities 287; and spurious copies 289a, 289b of the ADC quantization noise 289 at four times (4×) the baud rate frequency, as would be apparent to a person of ordinary skill in the art, although not shown in FIG. 2E for ease of illustration. As shown in FIG. 2E, the spurious copies 276a, 276b, 287a, 287b are double-sided and centered around 4 fbaud since the oversampling ratio is 4 in the exemplary embodiment. Since the DLPF implements a low-pass corner frequency at about the Nyquist frequency, the power spectral densities of signal 276, noise 287 and ADC quantization noise 289 are band limited and non-zero between zero and about fnyq. Also, the spurious copies 276a, 276b, 287a, 287b reflect this band limitation. Additional double-sided spurious copies of signal 276, noise 287 and ADC quantization noise 289 exist at other multiples of 4× the baud rate frequency such as 8× and 16× and these spurious copies are not shown in FIG. 2E.

Figures 2F, 3A:
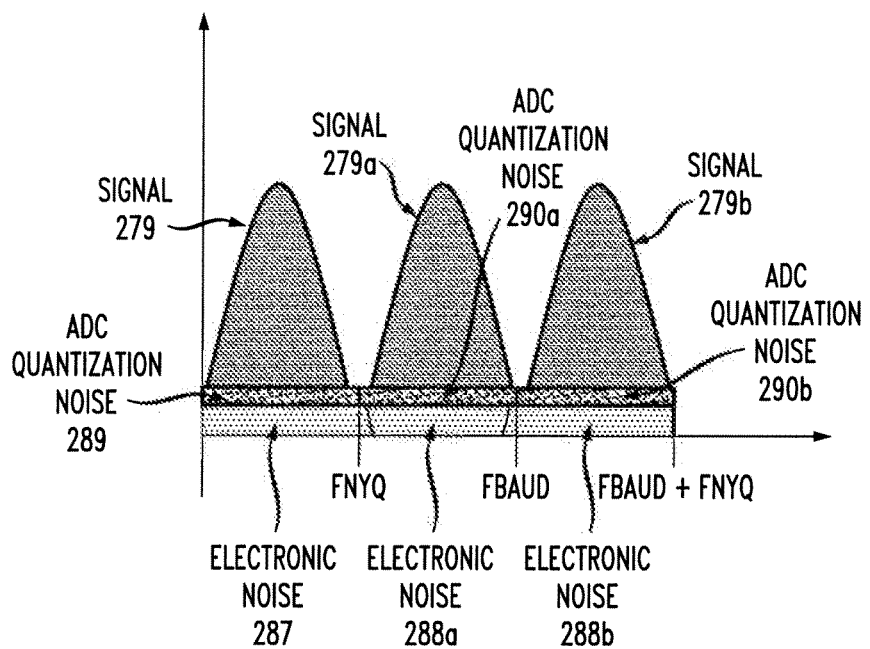

FIG. 2F illustrates the power spectral density of signal 279, noise 287 and ADC quantization noise 289 at the output of the downsampler 278 of FIG. 2A, as a function of frequency, where the downsampler 278 downsamples the signal (including the noise component) to baud rate. Due to the downsampling to baud rate, there are spurious copies 279a, 279b of the signal 279; spurious copies 288a, 288b of the noise densities 287; and spurious copies 290a, 290b of the ADC quantization noise 289 at various multiples of the baud rate frequency, as would be apparent to a person of ordinary skill in the art, although not shown in FIG. 2F for ease of illustration. As shown in FIG. 2F, the spurious copies 279a, 279b, 288a, 288b, 290a, 290b are double-sided and centered around the baud rate, fbaud. Due to the lowpass filtering with the DLPF prior to downsampling, as discussed above in conjunction with FIG. 2D, the power spectral densities of signal 279, noise 287 and ADC quantization noise 289 are band limited and non-zero between zero and about fnyq. Also, the spurious copies 279a, 279b, 288a, 288b (and all other spurious copies) reflect this band limitation and no aliasing occurs after down-sampling as a result.

As indicated above, the exemplary DLPF 275 can perform anti-alias filtering, band-limit filtering of electronic noise (and other noise components) and signal shape filtering to reduce ISI, in accordance with the present invention.

Generally, the anti-alias filtering removes noise and any residual signal components above the Nyquist frequency in order to avoid aliasing at the output of the downsampler 278. The DLPF 275 should therefore have a low pass corner frequency at about the Nyquist frequency, fnyq.

The VGA 220 and/or CTF 225 will perform anti-alias and band-limit filtering to avoid aliasing at the output of over-sampled ADC 250, and the DLPF 275 will perform anti-alias and band limit filtering to avoid anti-aliasing at the output of the downsampler 278. The low pass corner frequency of the VGA 220 and/or CTF 225 should be somewhere between the Nyquist frequency and half the oversampling frequency, while the low pass corner frequency of the DLPF 275 should be at around the Nyquist frequency. The present invention recognizes that since, for an oversampled system, the slope of the transfer function of the VGA 220 or CTF 225 at the low pass corner frequency can be less steep compared to a prior art baud rate system without oversampling, the design of the VGA 220 or CTF 225 is less challenging. In general, the higher the oversampling ratio, the less steep the slope needs to be.

In the exemplary embodiment illustrated in FIGS. 2A-2F, the VGA 220 limits noise and unwanted signal components above the baud rate frequency, and the DLPF 275 limits noise and unwanted signal components above the Nyquist frequency.

Optionally, the VGA 220, CTF 225 or DLPF 275 may perform additional signal shape filtering to, for example, equalize the signal in order to remove some or all intersymbol interference.

It is noted that if the VGA 220 implements a low pass filter function with a lowpass corner frequency somewhere between the Nyquist frequency and half the oversampling frequency, the CTF 225 can be omitted.

In further variations, the CTF 225 can perform low-pass filtering to reduce noise above half the sampling frequency of the oversampling ADC 250. In an exemplary implementation, the CTF 225 would implement only poles in the transfer function in order to implement low pass filtering. In another variation, the CTF 225 can optionally perform some pulse shaping or equalization by providing, for example, some high frequency boost. In an exemplary implementation, the CTF 225 would also implement zeros in the transfer function to provide high frequency boost.

As previously indicated, a suitable transfer function, H(s), for the CTF 225 is provided below in the following section entitled "Determining Coefficients for Digital LPF," where the numerator stages indicate the zeros and the denominator indicate the poles.

Determining Coefficients for Digital LPF

As indicated above, the exemplary data detection system 200 includes a DLPF 275. In an exemplary embodiment, the DLPF 275 is implemented as a finite impulse response (FIR) filter. Also, other well-known digital filter structures such as infinite impulse response (IIR) filter can be used. FIGS. 3A and 3B illustrate an exemplary technique for determining the filter coefficients of an FIR implementation of the DLPF 275. The design and implementation of FIR filters can be found, for example, in Keshab K. Parhi, "VLSI Digital Signal Processing Systems: Design and Implementation," (Jan. 4, 1999) or John G. Proakis and Dimitris K. Manolakis, "Digital Signal Processing," (4th Ed., Apr. 7, 2006).

It is again noted that the exemplary DLPF 275 performs one or more filter functions in the digital domain that were previously performed by a CTF in the analog domain in conventional read channels, in accordance with aspects of the present invention. According to another aspect of the invention, the DLPF 275 is programmed using fewer degrees of freedom. To provide adequate filtering capability, a digital filter that replaces at least a portion of a traditional CTF 225 in a read channel needs to have several taps, and also needs to support a wide range of values for each tap coefficient. Thus, it is more difficult to exhaustively optimize the digital filter, compared to optimizing the analog CTF. To help with this, the present invention maps the coefficient space of the DLPF 275 to the digital equivalent of an analog CTF 225 and provides a method to generate the desired filter coefficients.

As discussed hereinafter, the digital DLPF 275 can be optimized using just two degrees of freedom: cutoff and boost, in a similar manner to the conventional analog CTF 225. Generally, the cutoff frequency is the frequency at which the magnitude response of the denominator section of the transfer function is 3 dB below the magnitude response of the denominator section at DC. Likewise, boost is the magnitude response contribution of the numerator section measured at the cutoff frequency. Typically, boost provides for amplification of the input power at high frequencies close to the Nyquist frequency. This provides some equalization of the input signal.

Specifically, the DLPF 275 is programmed to be the bilinear transformed version of the CTF in the conventional baud-rate system. This digital filter is IIR (infinite impulse response) in general. To account for finite precision details, the DLPF 275 is further modified to be in FIR (Finite Impulse Response) form by mapping it to the truncated impulse response of the IIR filter.

In one exemplary implementation, the DLPF 275 is generated using user-specified Cutoff and Boost values. Given the user-specified Cutoff and Boost values, a transfer function, H(s), is constructed for the analog version of the filter, as follows:

$$H(s) = \frac{\frac{s}{a\omega_0}+1}{\frac{s^2}{\omega_0^2}+\frac{s}{1.086\omega_0}+1} \times \frac{-\frac{s}{a\omega_0}+1}{\frac{s^2}{\omega_0^2}+\frac{s}{1.086\omega_0}+1} \times \frac{1}{\frac{s^2}{\omega_0^2}+\frac{s}{0.6031\omega_0}+1}$$

where $\omega_0$ is the filter cutoff frequency; $\alpha$ is a zero location and s is the analog frequency.

Thereafter, the transfer function, H(s), is transformed to a frequency domain characterization, H(z), using an exemplary bilinear transform 300. As shown in FIG. 3A, the exemplary bilinear transform 300 from the continuous time domain to an oversampled digital domain can be expressed as follows:

$$s = \frac{2}{T_d}\left(\frac{1-z^{-1}}{1+z^{-1}}\right).$$

In one exemplary embodiment, the five terms from the exemplary transfer function, H(s) (two first order numerator terms and three second order denominator terms), are each separately applied to the bilinear transform 300 to produce a corresponding set of coefficients for a given stage, i, of a multi-stage IIR filter, as discussed further below in conjunction with FIG. 3B:

($\alpha^0, \alpha^1, \beta^0, \beta^1$).

Thus, the exemplary transform output comprises 20 IIR coefficients (four coefficients per stage for the exemplary five stage IIR filter).

In a further variation, the DLPF coefficients can be precomputed for a number of cutoff/boost combinations and stored in a look-up table. Thus, given the user-specified Cutoff and Boost values, the DLPF coefficients can be obtained from the look-up table. In this manner, the coefficients can be more quickly obtained (with a table look-up being faster than circuit computations).

Thus, the DLPF 275 is programmed using cutoff/boost combinations, where the DLPF coefficients are determined based on cutoff and boost either using either a coefficient computation filter or a lookup table. The coefficient computation filter computes the DLPF coefficients based on cutoff and boost as described above, for example, in conjunction with FIGS. 3A and 3B. Alternatively, the DLPF coefficients can be precomputed (using, for example, the described coefficient computation filter or other analytical means) and stored in a lookup table for different cut-off/boost combinations. During normal operation, the DLPF coefficients are then retrieved from the look-up table for a specific cutoff/boost pair. Generally, the look-up table employs cutoff and boost pair values as an input and provides the DLPF coefficients as an output. The cutoff/boost computation filter or the look-up table can be implemented in hardware, for example, in the read channel, or in firmware. A hardware implementation has the additional advantage of being easier to use and allows for faster computation of DLPF coefficients, while a firmware implementation provides flexibility (look-up table or computation filter can be easily changed by reprogramming firmware).

In addition, the bilinear transform 300 or the look-up table can be implemented in hardware, for example, in the data detection system 200, or in firmware. A hardware implementation may be easier to use and may allow for faster computation of the DLPF coefficients, while a firmware implementation provides flexibility (for example, the look-up table or computation filter can be easily changed by reprogramming firmware).

Figure 3B:
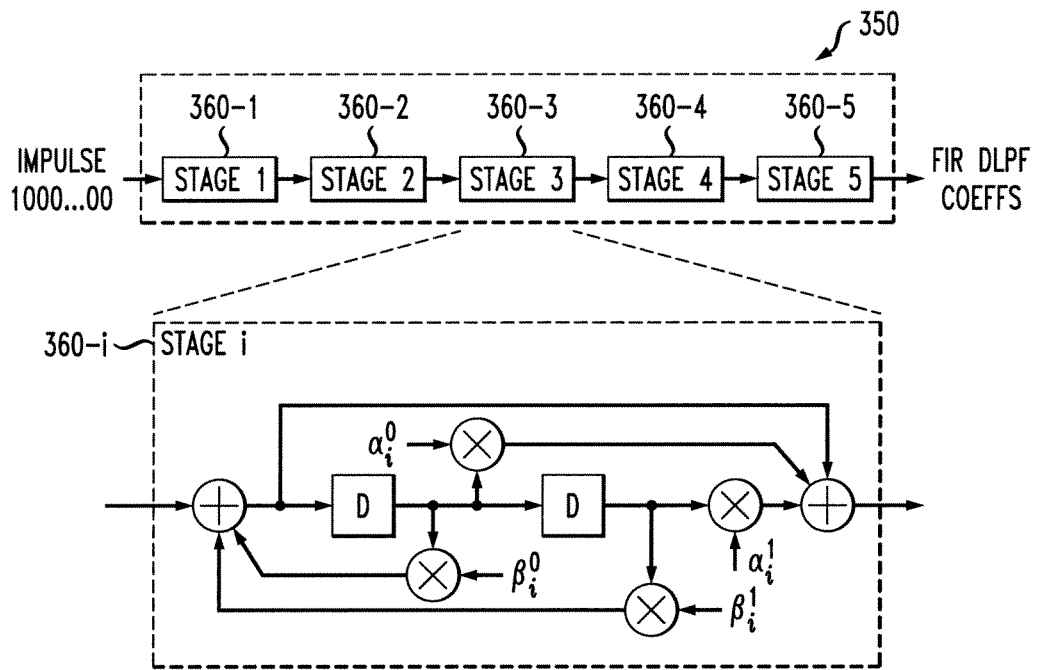

FIG. 3B illustrates an exemplary multi-stage IIR filter 350 that is used to determine the coefficients for the DLPF 275. As shown in FIG. 3B, the exemplary multi-stage IIR filter 350 comprises five stages 360-1 through 360-5. A given stage 360-*i* is comprised of a number of adders (+), multipliers (×) and delay elements (D), as shown in FIG. 3B. The coefficients generated for each stage by the bilinear transform 300 are applied to a corresponding multiplier (×), as shown in FIG. 3B. An impulse is applied to the input of the five-stage IIR filter 350 and the coefficients for the DLPF 275 are generated at the output of the five-stage IIR filter 350. As indicated above, in one exemplary implementation, the coefficients generated at the output of the five-stage IIR filter 350 are truncated to a maximum of 24.

Thus, the exemplary DLPF 275 has 24 filter tap coefficients. In this manner, an aspect of the invention allows the 24 coefficients to be obtained from only two independent variables (cutoff and boost (i.e., zero)), in a similar manner to analog implementations of LPFs. The user can thus optionally specify desired cutoff and boost values for the DLPF 275. Thereafter, the specified cutoff and boost values are used to compute the 24 coefficients that represent a fixed point DLPF 275.

Figure 3C:
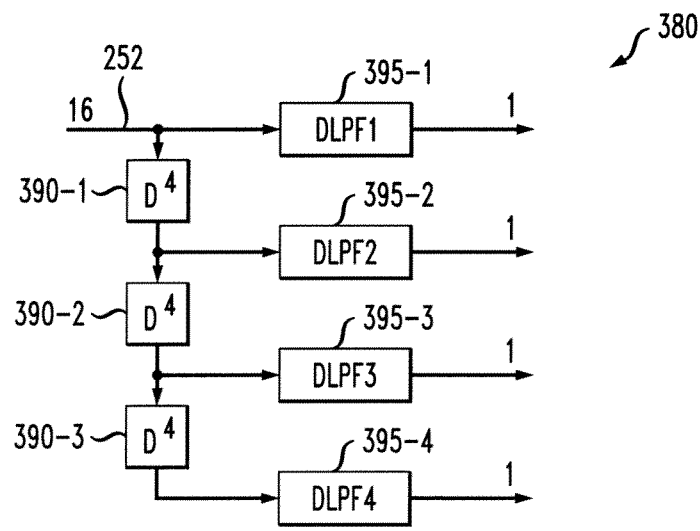
FIG. 3C illustrates an exemplary implementation of an integrated version of the DLPF and downsampler of FIG. 2A.

FIG. 3C illustrates an exemplary alternate implementation of an integrated DLPF and downsampler 380 corresponding to the DLPF 275 and downsampler 278 of FIG. 2A. Generally, the integrated DLPF and downsampler 380 performs downsampling while also performing the additional band-limit filtering of electronic noise, as well as signal shape filtering to reduce ISI, in accordance with the present invention.

The exemplary integrated DLPF and downsampler 380 is shown for an oversampling rate of N=4. It is noted that the exemplary ADC 250 generates four samples per bit duration. For a quarter rate implementation without oversampling, four baud rate samples are processed each 4T period (where T corresponds to one bit period), as opposed to one sample each period for a baud rate implementation without oversampling. The processing rate (throughput) remains one sample per bit duration, but now the samples are processed in parallel. For a quarter rate implementation with an oversampling rate of N=4, the exemplary integrated DLPF and downsampler 380 (at quarter-rate) processes 16 samples per 4T and generates the four samples per 4T that will be kept following the downsampling operation. In other words, the integrated DLPF and downsampler 380 does not generate the additional 12 samples per 4T that will be dropped by the downsampler 278.

As shown in FIG. 3C, the exemplary integrated DLPF and downsampler 380 includes three delay elements 390-1 through 390-3 that each delay the output 252 of the ADC 250 by four samples. In addition, the exemplary integrated DLPF and downsampler 380 comprises four parallel DLPFs 395-1 through 395-4 that each process the four time-delayed versions of the output 252 of the ADC 250. Each parallel DLPF 395 may be implemented as a DLPF having the coefficients generated by the IIR filter 350 of FIG. 3B.

Figure 4:
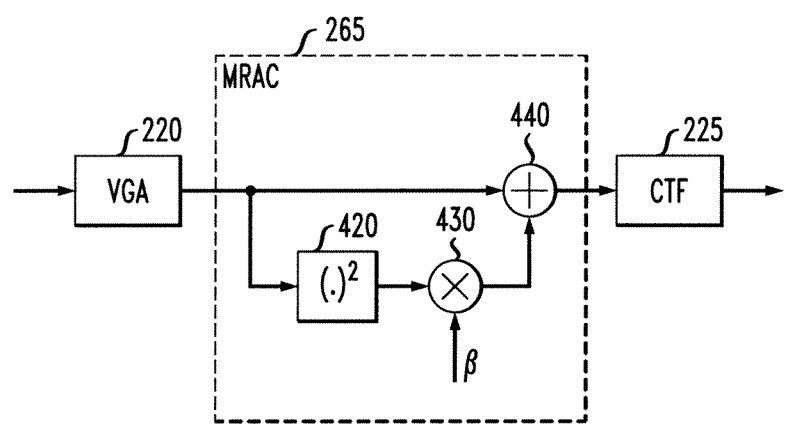
FIG. 4 is a block diagram of exemplary analog and digital MRA correction blocks, respectively, of FIG. 2A.

FIG. 4 is a block diagram of an exemplary analog MRA correction block 265 (FIG. 2A). As previously indicated, magneto-resistive (MR) heads that are used in magnetic recording systems typically exhibit non-linear transfer functions. Ideally, the output current(s) from the head is linearly related to the magnetic flux being read (x). However, most read heads exhibit quadratic non-linearity, with the result that the output current is expressed as follows:

$$s = kx + \alpha x^2,$$

where k is a scaling factor and α controls the level of non-linearity in the head. This phenomenon is referred to as MR asymmetry (MRA) in the head. In a conventional read channel, the analog portion may have an MRA correction (MRAC) block 265 (FIG. 2A), which approximates the inverse transfer function needed to linearize the output of the read head. In particular, the following equation is the transfer function of an MRAC block that approximates the linearizing transfer function using a quadratic transfer function:

$$y = k_2 s - \beta s^2,$$

where $k_2$ is a scaling factor and the coefficient β is chosen to minimize the residual error in the MRAC block output compared to an ideal linear transfer function. As shown in FIG. 4, the output of the VGA 220 of FIG. 2A is squared by the MRAC 265 at stage 420 and scaled at a multiplier 430 using the correction factor β before it is subtracted from the output of VGA 220 by adder 440. This ensures that the input to the continuous-time filter (CTF) 225 is linearized. It is noted that the DC correction performed by the adder 240 of FIG. 2A is omitted from FIG. 4 for ease of illustration.

As indicated above, the present invention recognizes that the MRAC block 265 (FIG. 2A) can alternatively be implemented in the digital domain, using samples generated by the analog-to-digital converter (ADC) 450. This leads to the digital MRAC (DMRAC) block 455.

Figure 5:
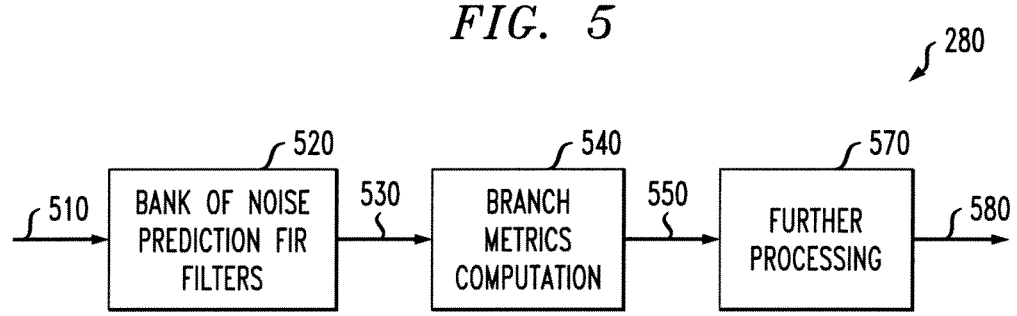
FIG. 5 is a block diagram of an exemplary detector that may be used in the data detection system of FIG. 2.

FIG. 5 is a block diagram of an exemplary detector 280 that may be used in in the exemplary data detection system 200 of FIG. 2. As shown in FIG. 5, the exemplary detector 280 processes an input 510 comprised of the downsampled filtered output from the DFIR 270. The exemplary detector 280 employs a bank of noise prediction FIR filters 520 to provide data-dependent equalization of FIR output samples in the baud-rate domain. The output 530 from this bank of filters 520 is processed by a branch metrics computation unit 540 to generate branch metrics 550, which are used for further processing at stage 570, in a known manner, to generate decisions and/or soft information as output 580. For a discussion of suitable noise prediction FIR filters 520 and branch metrics computation unit 540, see, for example, United States Published Application No. 2005/0249273, filed May 5, 2004, entitled "Method and Apparatus for Generating Filter Tap Weights and Biases for Signal Dependent Branch Metric Computation," incorporated by reference herein.

As previously indicated, the feedback loops 260 of FIG. 2 generate a set of equalizer coefficients 268 for the DFIR 270. FIGS. 6A and 6B illustrate exemplary techniques for adapting the set of equalizer coefficients 268. Generally, as discussed further below in conjunction with FIGS. 6A and 6B, adaptation algorithms for oversampled equalization are similar to those used for baud-rate equalization. For a baud-rate system, let $\{x_k\}$ be the input sequence to a length-M finite impulse response (FIR) filter with coefficients $\{f_n\}_{n=0}^{M-1}$, and let $\{y_k\}$ be the output sequence. Let $\{d_k\}$ be the desired sequence at the FIR filter output, based on the equalization target and the decision sequence (either from the detector or based on a priori information). The equalization error at time kT is $e_k = y_k - d_k$.

Figure 6A:
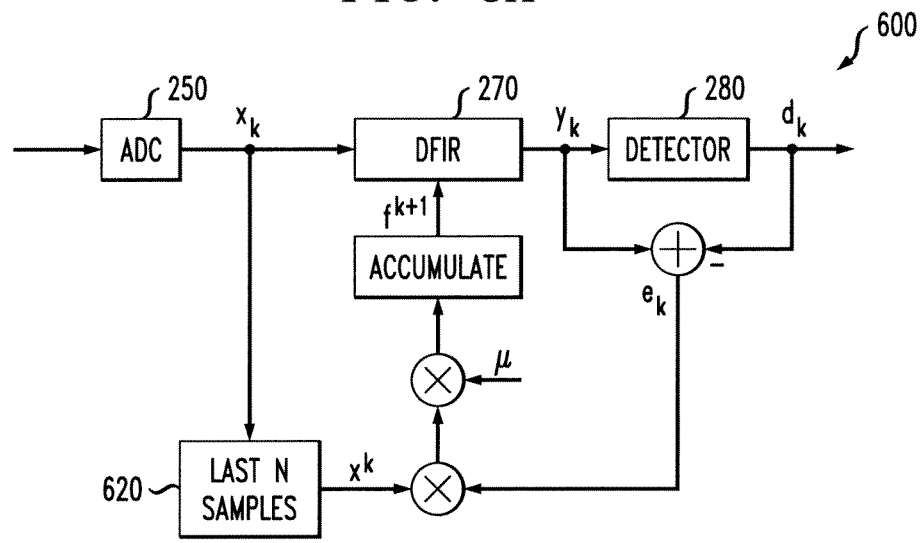
FIGS. 6A and 6B illustrate an exemplary least mean squares (LMS) adaptation algorithm and an exemplary zero-forcing (ZF) algorithm, respectively.

FIG. 6A illustrates an exemplary least mean squares (LMS) adaptation algorithm 600. Generally, the exemplary LMS adaptation algorithm 600 adapts the equalization coefficients as follows: $f^{k+1} = f^k - \mu e_k x^k$, where μ controls adaptation speed, $f^k$ is the vector of equalizer coefficients at time k and $x^k$ is a vector of the most recent N FIR inputs.

Instead of collecting one sample every T as with the conventional baud rate system, the exemplary oversampled least mean squares (LMS) adaptation algorithm 600 collects N samples every baud rate interval, corresponding to an oversampling rate of N. For the oversampled system, let $\{x_k\}$, the output from ADC 250, be the input sequence to the length-M finite impulse response (FIR) filter 270 with coefficients $\{f_n\}_{n=0}^{M-1}$, and let $\{y_k\}$ be the output sequence from filter 270. The FIR filter 270 with M coefficients now spans MT/N instead of MT as with the baud-rate system. Let $\{d_k\}$, the output of detector 680, be the desired baud-rate sequence at the FIR filter output, as before. It is noted that the oversampled digital samples can be available in the feedback loop. Thus, the LMS adaptation algorithm 600 can compute coefficients at the oversampled rate or at the baud rate. If the LMS adaptation algorithm 600 computes coefficients at the baud rate, the generated coefficient per bit interval is repeated N times to provide equalization coefficients at the oversampled rate.

Figure 6B:
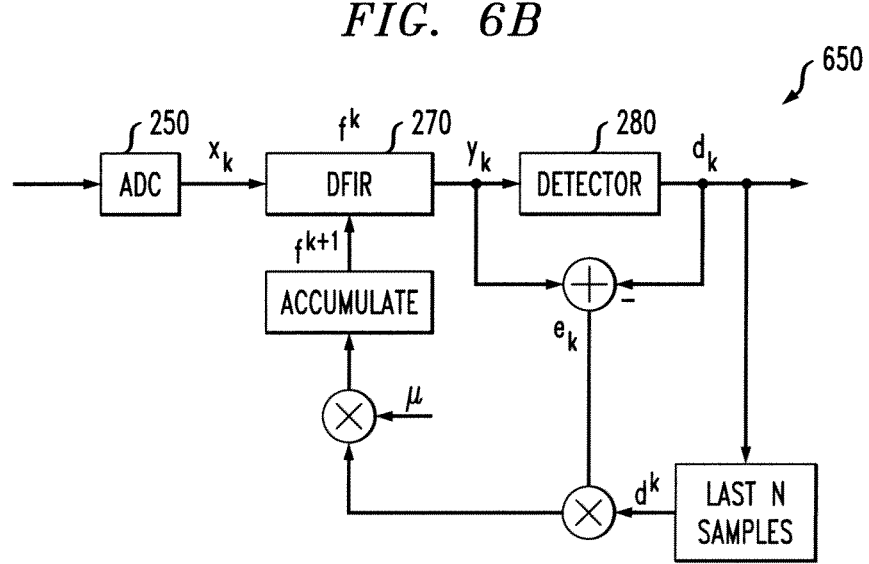

FIG. 6B illustrates an exemplary zero-forcing (ZF) algorithm 650. Generally, the exemplary ZF algorithm 650 adapts the equalization coefficients differently as follows: $f^{k+1} = f^k - \mu e_k d^k$. For the oversampled system, let $\{x_k\}$, the output from ADC 250, be the input sequence to the length-M impulse response (FIR) filter 270 with coefficients $\{f_n\}_{n=0}^{M-1}$, and let $\{y_k\}$ be the output sequence from filter 270. The FIR filter 270 with M coefficients now spans MT/N instead of MT as with the baud-rate system. Let $\{d_k\}$, the output of detector 280, be the desired baud-rate sequence at the FIR filter output, as before. It is noted that in the embodiment of FIG. 6B, the DFIR adaptation loop operates at the baud rate. Thus, the exemplary ZF algorithm 650 generates a single equalization coefficient per bit interval and the generated coefficient is repeated M times to provide equalization coefficients at the oversampled rate.

In one implementation, the error terms, $e_k$, are computed based on output of the oversampled filter at baud-rate intervals, with the result that the update equations are applied every T even with the oversampled system. This is useful when the output of the oversampled system is down-sampled to baud rate before being processed further in the detector and decoder.

In another implementation, the error terms, $e_k$, are computed every T/N. To do this, the baud-rate desired sequence $\{d_k\}$ must be interpolated to generate desired values corresponding to the sub-baud-rate sampling instants. The error terms, $e_k$, are then generated using the interpolated desired values and used in the LMS equation every T/N. For the ZF case, the interpolated desired values are also used in the update equation in place of $d_k$. The second exemplary implementation is desired when the output of the FIR filter 270 in the oversampled domain is processed in the detector 280 without down-sampling. Including error terms corresponding to the sub-baud-rate instants in the update equation ensures that the entire oversampled domain sequence shows desired equalization properties, as opposed to the first implementation, which enforces equalization constraints only on samples at baud-rate instants.

As previously indicated, aspects of the present invention provide an oversampled ADC that generates several digital samples per bit period. In this manner, the CTF circuit can be simplified by moving some or all of the equalization process to the digital domain. The oversampled ADC allows a portion of the filtering to be done in the analog domain and a portion of the filtering to be done in the digital domain.

According to one aspect of the present invention, the read channel can be configured to selectively filter the analog input signal in an analog domain in a first (baud rate) mode or to filter the oversampled digital samples in a digital domain in a second (oversampled) mode. Generally, the first mode corresponds to a continuous time domain and the second mode corresponds to an oversampled domain. In this manner, the digital filtering can be optionally bypassed in the first mode and the analog filtering can be optionally bypassed in the second mode.

The selection can be based, for example, on channel conditions. In this manner, baud-rate functionality is preserved in the oversampling read channel, and also overall system performance can be improved by selecting the better of the two modes (baud-rate vs. oversampling rate) depending on the channel conditions. As discussed hereinafter, the oversampled analog to digital conversion can be performed at a baud rate in the first mode and at an oversampled rate in the second mode.

Figure 7:
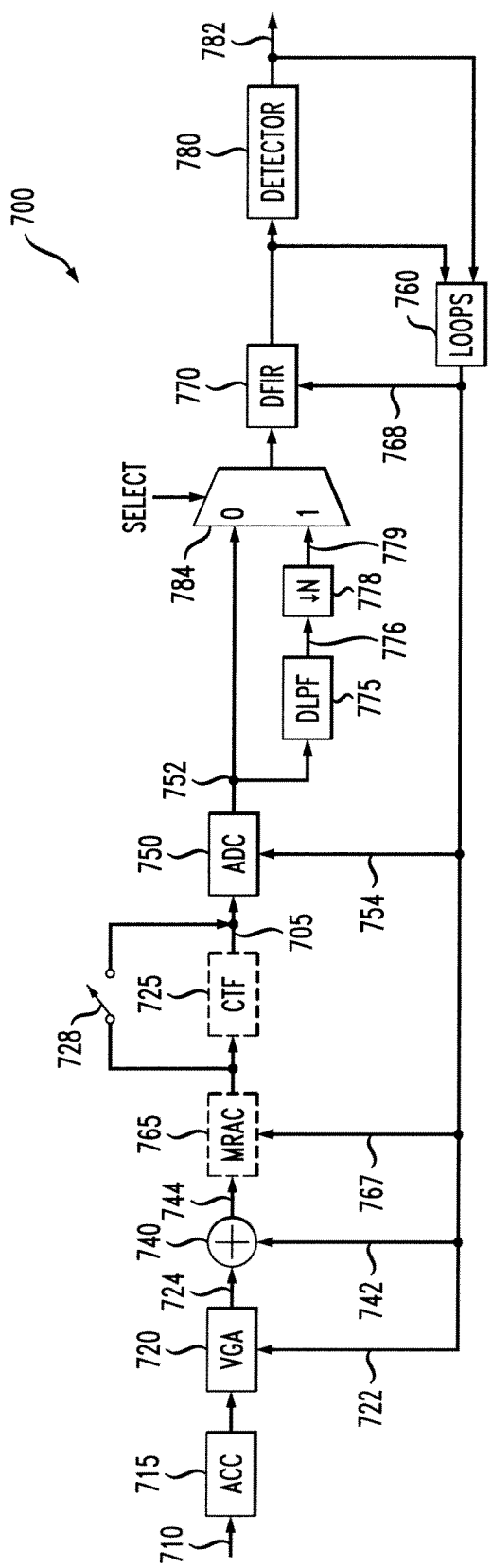
FIG. 7 illustrates an exemplary data detection system incorporating various aspects of the present invention, including a selective oversampled ADC.

FIG. 7 illustrates an exemplary data detection system 700 incorporating a configurable mode aspect of the present invention. Generally, the configurable mode allows the data detection system 700 to be configured either in a baud-rate mode or in an oversampling mode. As discussed hereinafter, in a baud-rate mode, the ADC samples are generated by the ADC 750 at baud-rate, and the DLPF 775 and downsampler 778 are bypassed. The DLPF 775 and downsampler 775 can optionally be powered down in the baud-rate mode to save power. The anti-alias and noise band-limit filtering are done by the CTF 725 (i.e., the CTF 725 needs to have a low-pass corner frequency at around the Nyquist frequency fnyq). The CTF 725 may optionally also perform some equalization, for example, by applying a high-frequency boost.

In an oversampling mode, the ADC 750 oversamples the incoming signal by a factor of N, where N is an integer or non-integer number larger than 1. The CTF 725 would preferably perform some anti-alias and band-limit filtering to avoid aliasing of the oversampled signals at the output of the ADC 750. The low-pass corner frequency of the CTF 725 is preferably somewhere between the Nyquist frequency fnyq and half the oversampling frequency N*fbaud. The CTF 725 can optionally also be bypassed in an oversampling mode to save power, for example, if any performance degradation due to aliasing at the output of the downsampler is small or permissible. Compared to the baud-rate mode, the roll-off in the CTF frequency response at the low-pass corner frequency can be less steep. In an oversampling mode, the DLPF 775 performs further anti-alias and band-limit filtering to avoid aliasing at the output of the downsampler 778. The low-pass corner frequency of the DLPF 775 is preferably at around the Nyquist frequency fnyq to avoid aliasing at the output of the downsampler 778. The downsampler 778 downsamples the signal to the baud rate. Generally, the downsampling ratio is N. In the exemplary embodiment, the oversampling ratio is N=4, and therefore the downsampling ratio is also N=4. The CTF 725 and/or DLPF 775 may optionally also perform some equalization, for example, by applying a high-frequency boost. For a more detailed discussion of power spectral densities and preferable low-pass corner frequencies, see the discussion above of FIGS. 2B-2F. Since the ADC 750 typically supports a maximum data rate, DR, equal to fbaud, the data detection system 700 in FIG. 7 would support this maximum data rate DR in a baud-rate mode, and support a maximum data rate of 1/N*DR in an oversampling mode.

As shown in FIG. 7, the data detection system 700 includes an analog front end that receives an analog input signal 710 via AC coupling 715, in a similar manner to the conventional data detection system 100 of FIG. 1. In addition, the output of AC coupling 715 is amplified using a variable gain amplifier 720, governed by a gain feedback value 722 that is provided by a feedback loop 760, in a similar manner to FIG. 1. The amplified input 724 is summed with an offset value 742 using a summation element 740. Offset value 742 is provided by a feedback loop 760, in a similar manner to FIG. 1.

As shown in FIG. 7, the sum 744 is provided to an MRA correction filter 765 that approximates the inverse transfer function needed to linearize the head output, as discussed further below in conjunction with FIG. 4. The output of the MRA correction filter 765 is selectively applied to an optional CTF 725 that may operate to filter undesirable noise from the received analog signal, as discussed above. As shown in FIG. 7, the selective application of the output of the MRA correction filter 765 to the CTF 725 is controlled by a switch 728. The switch 728 is controlled by a selection signal indicating a first or second mode of operation. The selection signal may be based, for example, on channel conditions. As previously indicated, an aspect of the present invention simplifies the CTF 725 by moving some or all of the anti-alias filtering, band-limit filtering and equalization process to the digital domain. Generally, the CTF 725 is part of the signal path in the first mode, and is optionally bypassed in the second mode (for example, depending on whether part or all of the anti-alias filtering, band-limit filtering and equalization is shifted to the digital domain).

A data input 705 representative of analog input signal 710 is provided to an ADC 750 that converts the continuous analog signal 705 into one or more corresponding digital samples 752 for each bit interval. For example, in the second (oversampled) mode, the oversampling ADC may generate N=2 or N=4 digital samples 752 for each bit interval. In the first (baud rate) mode, the oversampling ADC may generate one digital sample 752 for each bit interval. Digital samples 752 are obtained in accordance with a clock signal 754 generated based on the received data, for example, by a digital phase lock loop circuit within loops 760. The loops 760 may operate in a similar manner to the loops 260 of FIG. 2A, as discussed above in conjunction with FIG. 2A. The analog to digital conversion 750 can thus be performed at a baud rate in the first mode and at an oversampled rate in the second mode.

The digital samples 752 are then selectively filtered by a digital low pass filter (DLPF) 775, discussed above in conjunction with FIGS. 3A through 3C, in the second mode, before being applied by a multiplexer 784 to a DFIR 770. Generally, the DLPF 775 performs additional band-limit filtering of electronics noise, as well as signal shape filtering to reduce ISI, in accordance with the present invention. In the exemplary embodiment of FIG. 7, the filtered output 776 generated by the DLPF 775 is then downsampled to a baud rate by a downsampling circuit 778. As discussed above in conjunction with FIG. 3C, the DLPF 775 and downsampling circuit 778 can optionally be implemented as a single circuit. The downsampled output 779 generated by the downsampling circuit 778 comprises a single digital sample for each bit interval. The downsampled output 779 is provided by the multiplexer 784 to the digital FIR 770 that provides a filtered output to a data detector 780, in a similar manner to FIGS. 1 and 2. Data detector 780, such as a Viterbi algorithm data detector, provides an ideal output 782 that is processed by feedback loops 760. The data detector 780 may be any known data detector circuit.

Alternatively, the digital samples 752 can be applied by the multiplexer 784 without further digital filtering to the DFIR 775 in the first mode (i.e., the DLPF 775 and downsampler 778 are bypassed).

The feedback loops 760 may comprise, for example, the gain calculation circuit 130, offset circuit 195 and digital phase lock loop circuit 160 of FIG. 1, that generate a gain feedback value 722, an offset value 742 and a clock signal 754, respectively, in a similar manner to FIG. 1. In addition, the feedback loops 760 generate a feedback value 767 for the MRAC 765, in a known manner, as discussed above in conjunction with FIG. 4, and a set of equalizer coefficients 768 for the DFIR 770, as discussed above in conjunction with FIGS. 6A and 6B.

Figure 8:
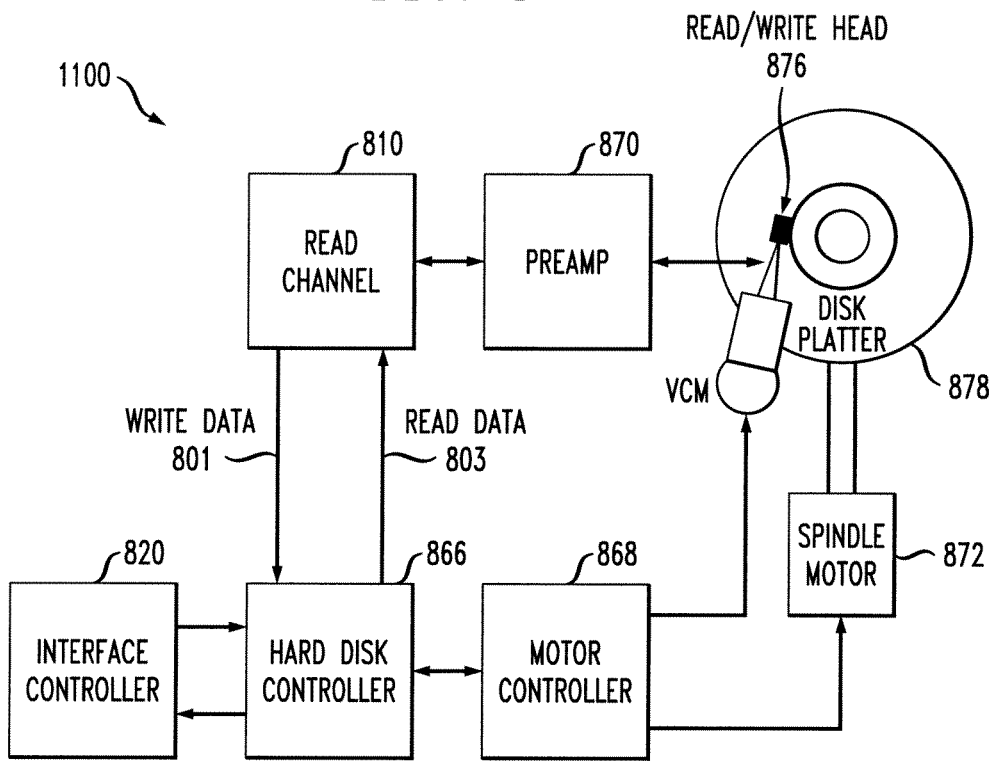
FIG. 8 illustrates a storage system in accordance with various embodiments of the present invention.

FIG. 8 illustrates a storage system 800 in accordance with various embodiments of the present invention. Storage system 800 may be, for example, a hard disk drive. Storage system 800 includes a read channel 810. In addition, storage system 800 includes an interface controller 820, a preamp 870, a hard disk controller 866, a motor controller 868, a spindle motor 872, a disk platter 878, and a read/write head 876. Interface controller 820 controls addressing and timing of data to/from disk platter 878. The data on disk platter 878 consists of groups of magnetic signals that may be detected by read/write head assembly 876 when the assembly is properly positioned over disk platter 878. In a typical read operation, read/write head assembly 876 is accurately positioned by motor controller 868 over a desired data track on disk platter 878. Motor controller 868 both positions read/write head assembly 876 in relation to disk platter 878 and drives spindle motor 872 by moving read/write head assembly to the proper data track on disk platter 878 under the direction of hard disk controller 866. Spindle motor 872 spins disk platter 878 at a determined spin rate (RPMs).

Once read/write head assembly 878 is positioned adjacent the proper data track, magnetic signals representing data on disk platter 878 are sensed by read/write head assembly 876 as disk platter 878 is rotated by spindle motor 872. The sensed magnetic signals are provided as a continuous, minute analog signal representative of the magnetic data on disk platter 878. This minute analog signal is transferred from read/write head assembly 876 to read channel module 810 via preamp 870. Preamp 870 is operable to amplify the minute analog signals accessed from disk platter 878. In addition, preamp 870 is operable to amplify data from read channel module 810 that is destined to be written to disk platter 878. In turn, read channel module 810 decodes and digitizes the received analog signal to recreate the information originally written to disk platter 878. This data is provided as read data 803 from the read channel module 810 to the hard disk controller 866, and in turn, to a receiving circuit. A write operation is substantially the opposite of the preceding read operation with write data 801 being provided from the hard disk controller 866 to the read channel module 810. This data is then encoded and written to disk platter 878.

Figure 9:
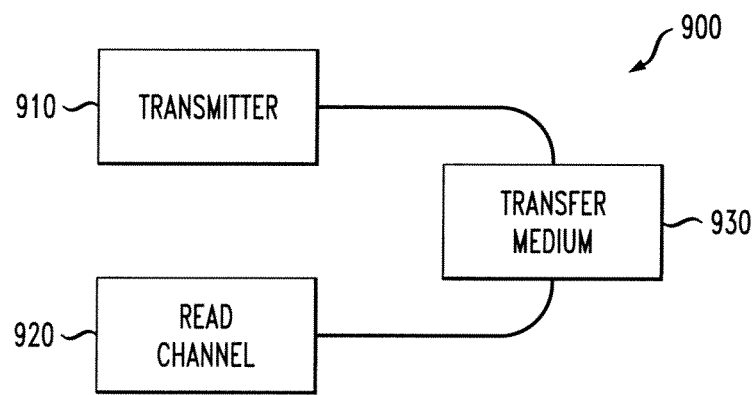
FIG. 9 illustrates a communication system including a receiver in accordance with one or more embodiments of the present invention.

FIG. 9 illustrates a communication system 900 including a receiver 920 in accordance with one or more embodiments of the present invention. Communication system 900 includes a transmitter that is operable to transmit encoded information via a transfer medium 930 as is known in the art. The encoded data is received from transfer medium 930 by receiver 920.

As previously indicated, the oversampled ADC of the present invention allows the CTF circuit to be simplified or eliminated by transferring at least a portion of the filtering and/or equalization processes to the digital domain. For example, (i) anti-alias and/or band limit filtering to reduce out-of-band noise and (ii) pulse shape filtering to compensate for intersymbol interference can now be performed in the digital domain.

In addition, the oversampled ADC of the present invention allows an optional magneto-resist asymmetric (MRA) correction filter to be implemented in the analog domain, for example, prior to an optional CTF 225, as shown in FIGS. 2A and 4.

In other exemplary variations, the DLPF and downsampling devices described herein can either be implemented as separate and distinct circuits, as shown in FIG. 2A, or as an integrated device, as shown in FIG. 3C.

In one example, the disclosed methods and apparatus may be used in the storage system of FIG. 8 or the communication system of FIG. 9.

As previously indicated, the arrangements of data detection systems and read channels, as described herein, provide a number of advantages relative to conventional arrangements. As indicated above, the disclosed techniques for implementing a read channel having an oversampled ADC allows at least a portion of the equalization, anti-alias filtering and/or noise band limit filtering processes to be performed in the digital domain, which relaxes the design difficulty of the analog CTF circuit. Also, since the area of digital circuits reduces proportionally with shrinking process geometries, while the area of analog circuits does not reduce as significantly, the disclosed techniques for moving some of the analog signal processing functions into the digital domain will help to design integrated circuits and chips with less area compared to conventional techniques, especially at future process geometries.

Again, it should be emphasized that the above-described embodiments of the invention are intended to be illustrative only. In general, the exemplary data detection systems can be modified, as would be apparent to a person of ordinary skill in the art, to incorporate an oversampled ADC and allow at least a portion of the equalization process or other filtering to be performed in the digital domain. In addition, the disclosed techniques for generating a plurality of digital samples per bit interval can be employed in any data detection system or read channel.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method for processing a signal in a read channel, comprising:
    obtaining an analog input signal;
    performing an analog to digital conversion on said analog input signal to generate one or more digital samples corresponding to said analog input signal for a given bit interval;
    selectively filtering said analog input signal in an analog domain in a first mode and filtering said digital samples in a digital domain in a second mode; and
    performing a data detection algorithm on one or more of the digital samples to obtain a detected output.

2. The method of claim 1, wherein said selective filtering step bypasses said analog filtering in said second mode.

3. The method of claim 2, wherein said bypassed analog filtering is performed by a continuous time filter.

4. The method of claim 1, wherein said selective filtering step bypasses said digital filtering in said first mode.

5. The method of claim 1, wherein one of said first mode and said second mode is selected based on channel conditions.

6. The method of claim 1, wherein said first mode corresponds to a continuous time domain and said second mode corresponds to an oversampled domain.

7. The method of claim 1, wherein said step of performing an oversampled analog to digital conversion is performed at a baud rate in said first mode and at an oversampled rate in said second mode.

8. A read channel, comprising:
    an analog to digital converter for converting an analog input signal to a digital signal, wherein said digital signal comprises one or more digital samples corresponding to said analog input signal for a given bit interval;
    means for selectively filtering said analog input signal in an analog domain in a first mode and for filtering said digital samples in a digital domain in a second mode; and
    a data detector for performing a data detection algorithm on one or more of the digital samples to obtain a detected output.

9. The read channel of claim 8, wherein said means for selective filtering bypasses said analog filtering in said second mode.

10. The read channel of claim 9, wherein said bypassed analog filtering is performed by a continuous time filter.

11. The read channel of claim 8, wherein said means for selective filtering bypasses said digital filtering in said first mode.

12. The read channel of claim 8, wherein one of said first mode and said second mode is selected based on channel conditions.

13. The read channel of claim 8, wherein said first mode corresponds to a continuous time domain and said second mode corresponds to an oversampled domain.

14. The read channel of claim 8, wherein said analog to digital conversion is performed at a baud rate in said first mode and at an oversampled rate in said second mode.

15. An integrated circuit, comprising:
    an analog to digital converter for converting an analog input signal to a digital signal, wherein said digital signal comprises one or more digital samples corresponding to said analog input signal for a given bit interval;
    means for selectively filtering said analog input signal in an analog domain in a first mode and for filtering said digital samples in a digital domain in a second mode; and
    a data detector for performing a data detection algorithm on one or more of the digital samples to obtain a detected output.

16. The integrated circuit of claim 15, wherein said means for selective filtering bypasses said analog filtering in said second mode.

17. The integrated circuit of claim 15, wherein said means for selective filtering bypasses said digital filtering in said first mode.

18. The integrated circuit of claim 15, wherein one of said first mode and said second mode is selected based on channel conditions.

19. The integrated circuit of claim 15, wherein said first mode corresponds to a continuous time domain and said second mode corresponds to an oversampled domain.

20. The integrated circuit of claim 15, wherein said analog to digital conversion is performed at a baud rate in said first mode and at an oversampled rate in said second mode.

* * * * *